Patented June 24, 1952

2,601,538

UNITED STATES PATENT OFFICE 2,601,538

CATALYTIC ISOMERIZATION OF PROPYLENE OXIDE TO PROPIONALDEHYDE, CATALYST THEREFOR, AND SYNTHESIS OF CATALYST

Lester G. Lundsted, Grosse Ile, Mich., assignor to Wyandotte Chemicals Corporation, Wyandotte, Mich., a corporation of Michigan No Drawing. Application July 2, 1948,
Serial No. 36,807

5 Claims. (Cl. 260—601)

The present invention relates to the catalytic isomerization or molecular rearrangement of propylene oxide (preferably 1,2-propylene oxide) to produce, as the major and predominant product, propionaldehyde. The invention also relates to a novel catalyst composition for such isomerization process, as well as the method of synthesizing such catalyst.

The isomerization of alkylene alpha oxides to aldehydes has constituted a field of study and experimentation by organic chemists for more than the past 40 years. Ipatieff and Leontovitch (Berichte vol. 36, p. 2016, 1903) first discovered that such isomerization of olefin oxides could be effected by the use of alumina as the catalyst. Then, beginning in 1930 Baur (U. S. Patents 1,906,833 and 2,031,200), Young et al. (U. S. Patent 1,917,179) and Law and McNamee (U. S. Patent 2,159,507) extended the work to include other catalysts. Baur disclosed such catalysts as magnesium pyrophosphate and cerous sulfate from which propionaldehyde was obtained "in good yield" (see Examples 1 and 2 of U. S. 2,031,200); and barium bromide and magnesium oxychloride, from which the propylene oxide conversion product contained a maximum yield of 60% propionaldehyde (see Examples 1 and 2 of U. S. 1,906,833). Law et al. disclosed the use of "alum" type catalysts, such as potassium aluminum sulfate, ammonium aluminum sulfate, potassium chromate and potassium ferric sulfate (U. S. 2,159,507). According to Law et al. (p. 1, col. 1, ll. 25 et seq.) oxy acids, anhydrides and salts of the elements of the fifth and sixth groups of the periodic table, were subject to the disadvantage as catalysts in the isomerization of propylene oxide, in that the condensation or polymerization of propionaldehyde was promoted rather than being retarded.

I have now discovered that the catalytic isomerization of propylene oxide to propionaldehyde can be conducted in the presence of a chromic oxide-tungstic oxide catalyst composition. Such catalyst composition is a complex, the exact identity of which is not yet established, but conforming to the formula $XCr_2O_3 \cdot WO_3$ and for results wherein a high conversion of propylene oxide and a high percentage of propionaldehyde in the conversion products are desired to be obtained, X has a value of more than 4 and less than 75. I have discovered that as high as a 100% conversion of the propylene oxide, and up to 88% of propionaldehyde in the conversion products (herein called "yield") can be obtained by the catalytic isomerization process employing such chromic oxide-tungstic oxide catalyst. This unusually high conversion and high yield of propionaldehyde exceeds the best (cf. "overall yields" and "efficiencies," of examples of U. S. 2,159,507, equivalent to "conversions" and "yields," respectively, of the instant application) that have heretofore been obtainable.

The catalytic isomerization process of my invention is also of an unexpected nature when it is considered that a chromic oxide gel catalyst alone promotes isomerization of propylene oxide principally to allyl alcohol; propionaldehyde being a minor product. See co-pending U. S. patent application Serial No. 588,710, filed April 16, 1945, now Patent Number 2,479,632 by Lester G. Lundsted, Edward J. Schwoegler and Edward C. Jacobs, said Lundsted being applicant herein.

My invention also possesses the additional advantage in that the chromic oxide-tungstic oxide catalyst possesses an unusually high catalyst life, or period of catalytic activity. In other words, such catalyst not only remains active for a relatively long period of time before requiring regeneration, but possesses a renewed and high degree of catalytic activity after regeneration, so that the original catalyst mass can be repeatedly used and re-used in the process without the necessity of being discarded.

PREPARATION OF CATALYST

Example 1

Four hundred grams of chromium trioxide and 100 grams of tungstic acid were ground in a ball mill for two hours until the mass appeared homogeneous. The resulting powder was transferred to a porcelain evaporating dish and heated in an oven at 200 to 220° for 24 hours to decompose a portion of the chromium trioxide. At the end of this period the dish containing the mixture was transferred to a muffle furnace and heated to 1000° during a period of four hours. Violet fumes, probably a result of the decomposition of the chromium-trioxide, were liberated during this period. The mixture was held at 1000° for four hours and then allowed to cool in the furnace to give a bright green porous cake weighing 357.7 grams. This cake was broken up and used directly for catalytic studies. Analysis of the product showed 77.5% $Cr_2O_3$ and 21.3% $WO_3$ corresponding to a mol ratio of 5.5 to 1.

Example 2

In this method of preparation of the chromic oxide-tungstic oxide catalyst, a precipitate was formed by the addition of a solution of sodium tungstate to a solution of chromic nitrate. To 188 grams of chromium nitrate nonahydrate (Cr(NO₃)₃—9H₂O) in 250 ml. of distilled water were added 234 grams of sodium tungstate dihydrate (Na₂WO₄—2H₂O). The pale green precipitate which formed was filtered off and dried in an oven at 110° to yield a bright green cake covered by large needles of sodium nitrate. The solid was crushed and washed with distilled water until tests for nitrate ion with ferric sulfate-sulfuric acid and for sodium with magnesium uranyl acetate were negative. The solid material was removed by filtration and dried at 120 to 150° in an oven. The finished product, weighing 221.3 grams analyzed 75.2% tungsten as tungsten trioxide and 14.8% chromium as chromic oxide. Loss on heating at 180° was 5.11%. This corresponded to a mol ratio of 0.33 mol Cr₂O₃ per mol of WO₃.

PROPYLENE OXIDE ISOMERIZATION

Several chromic oxide-tungstic oxide catalyst compositions, made according to the foregoing examples, but in which the Cr₂O₃—WO₃ ratio was varied, were then placed in a glass tubular heating furnace measuring 25 mm. by 600 mm., wound with electrical resistance heating wire as the heat source and packed with glass wool in the top and bottom of the glass heating furnace. A thermocouple was located in the glass wool section in the top of the tube, which section functioned as the preheater for the propylene oxide fed down through the top of the glass tube furnace. A second thermocouple was located within the interior of the catalyst bed. The temperature of the furnace was automatically controlled. The rate of flow of the propylene oxide through the furnace was measured both in terms of linear feet per second and grams per hour per liter of catalyst. The determination of the flow velocity in terms of linear velocity or "feet per second," instead of space velocity or "grams per hour per liter of catalyst," is preferred in the present process because it has been found by experience to be a more reliable and more readily re-producible method of measurement.

The products were analyzed by an infrared spectograph, this proving to be the most reliable method for correctly determining propionaldehyde in the presence of acetone and other possible products such as allyl alcohol and dimethyl dioxane.

The results obtained on the several catalyst compositions so tested as having varying Cr₂O₃—WO₃ mol ratios were as stated in the following table. The percentages of "conversion" and "yield" as employed in this table have the following definitions:

Per cent conversion =

$$\frac{\text{wt. of propylene oxide consumed}}{\text{wt. of propylene oxide fed}} \times 100$$

Per cent yield =

$$\frac{\text{wt. of product}}{\text{wt. of propylene oxide consumed}} \times 100$$

Table I

| Catalyst No. | Mol Ratio Cr₂O₃/WO₃ | Control Temp. °C. | Max. Bed Temp. °C. | Linear Velocity ft./sec. | Space Velocity g./l/hr. | Time on Stream hrs. | Conversion Per Cent | Yield of Propionaldehyde (Percent of Converted Propylene Oxide) |
|---|---|---|---|---|---|---|---|---|
| O-1916B-2[1] | 0.20/1 | 250 | 300 | .024 | 335 | 38.4 | 73.0 | 69.0 |
| O-1916B-1[1] | 0.28/1 | 250 | 286 | .025 | 520 | 24.6 | 57.0 | 69.5 |
| O-1885[1] | 0.82/1 | 250 | 265 | | 384 | 24 | 68.5 | 85.2 |
| O-1989 | 4.2/1 | 300 | 337 | .039 | 300 | 13 | 92.0 | 78.0 |
| O-2209 | 4.7/1 | 215 | 270 | .034 | 198 | 337.3 | 97.2 | 85.7 |
| O-2009 | 5.6/1 | 215 | 300 | .032 | 285 | 5.9 | 100.0 | 88.3 |
| O-2042 | 11.4/1 | 215 | 315 | .036 | 320 | 5 | 98.5 | 84.2 |
| O-2045 | 23.0/1 | 215 | 312 | .037 | 328 | 6 | 99.5 | 85.0 |
| O-2057 | 35.7/1 | 215 | 270 | .034 | 312 | 6 | 98.5 | 81.8 |
| O-2077 | 73.0/1 | 215 | 272 | .034 | 305 | 6 | 100.0 | 80.0 |
| O-2177 | 188/1 | 215 | 314 | .037 | 327 | 9.5 | 93.0 | 72.4 |

[1] Catalyst made by method of Example 2, all others by method of Example 1.

The results of the foregoing table thus confirm the previous statement that the preferred range of Cr₂O₃/WO₃ mol ratio in the catalyst composition is greater than 4 to 1 and less than 75 to 1. Beyond the upper and lower limits of this range, it will be seen that there is a material depreciation in either the conversion percentage, or the proportion of propionaldehyde in the converted products. In this optimum Cr₂O₃/WO₃ mol ratio range, the percentage conversion is practically 100% (i. e. 97.2–100%) and the percentage of propionaldehyde in the converted products is 80.0–88.3%.

Preferred operating conditions were established as in the ranges of 0.02–0.07 feet per second linear velocity of propylene oxide and a furnace control temperature of 200–300° C.

CATALYST LIFE TESTS

Two catalyst compositions, prepared according to Example 1 and having the Cr₂O₃/WO₃ mol ratios of 35.5/1 and 4.7/1 respectively, were placed in a stainless steel heating furnace having an interior catalyst-containing-chamber measuring 1" by 43". This heating chamber was enclosed in a fluid-type jacket containing "Dowtherm" fluid. The heat source was provided by two parallel electric heating elements wound around the outer jacket and having a capacity of 15 amperes at 110 volts. Suitable thermocouples and thermostatically controlled rheostats were provided for maintaining and measuring furnace temperature and the catalyst bed temperature. The catalyst was placed in the interior of the stainless steel heating furnace tube, forming a catalyst bed of 12" depth.

Each one of the 35.5/1 and 4.7/1 Cr₂O₃/WO₃ mol ratio catalyst compositions was subjected to operating cycles totalling 652.5 and 563.2 hours of operation respectively. At the end of each operating cycle (the minimum cycle being 109.8 hours), the catalyst was regenerated by heating in an air stream until analysis of exhaust gases showed the same percentages of oxygen as the feed gases. This was taken as an indication that carbon and resinous deposits had been burned off and the catalyst was ready for re-use.

The results taken from the second and fourth cycles of such catalyst life study tests are tabulated as follows:

| Cycle Number | Catalyst No. 0-2183 (35.5/1 Cr$_2$O$_3$/WO$_3$) | | Catalyst No. 0-2209 (4.7/1 Cr$_2$O$_3$/WO$_3$) | |
|---|---|---|---|---|
| | 2 | 4 | 2 | 4 |
| Average space velocity, g./1/hr | 212 | 191 | 198 | 207 |
| Average linear velocity, ft/sec | 0.0365 | 0.033 | 0.034 | 0.038 |
| Propylene oxide feed, g | 3,602 | 3,106.5 | 4,499 | 2,504 |
| Products recovered, g | 3,527 | 3,022 | 4,393 | 2,454 |
| Total conversion to, g.: | | | | |
| Propionaldehyde | 3,002 | 2,482 | 3,746 | 2,082 |
| Acetone | 74 | 58.7 | 64.0 | 38.2 |
| Allyl Alcohol | 311.6 | 292.3 | 274 | 179.8 |
| Unidentified | 112.5 | 191.1 | 190 | 146.2 |
| Per Cent Conversion | 99.4 | 100 | 97.5 | 99.5 |
| Per Cent Yield: | | | | |
| Propionaldehyde | 83.8 | 80.3 | 85.7 | 81.2 |
| Acetone | 2.1 | 1.2 | 1.4 | 1.6 |
| Allyl Alcohol | 8.7 | 9.2 | 6.2 | 7.3 |
| Unindentified | 3.3 | 5.8 | 4.2 | 6.0 |
| Loss | 2.1 | 2.8 | 2.5 | 3.9 |
| Average production/24 hrs. g./1 of catalyst: | | | | |
| Propionaldehyde | 4,180 | 3,140 | 3,960 | 4,181 |
| Acetone | 103 | 81.2 | 67.7 | 77 |
| Allyl Alcohol | 430 | 404 | 290 | 362 |
| Unidentified (principally dimethyl dioxane) | 156 | 266 | 201 | 294 |

From the foregoing table, it will be seen that even at the end of the fourth cycle or run in each case, that the conversion percentage remained at its maximum and the yield of propionaldehyde was still over 80%.

Other modes of applying the principle of my invention may be employed, changes being made as regards to the details described, provided the features stated in any of the following claims or the equivalent of such be employed.

I, therefore, particularly point out and distinctly claim as my invention:

1. The process of making propionaldehyde comprising passing propylene oxide vapor over a heated chromic oxide-tungstic oxide complex catalyst selected from the group consisting of a catalyst prepared by reacting chromium nitrate with sodium tungstate in aqueous solution, washing the precipitate free of sodium nitrate and filtering and heat-drying the precipitate, and a catalyst prepared by heating an intimate physical mixture of chromic oxide and tungstic acid to form a complex thereof having high catalytic activity.

2. The process of claim 1 wherein the catalyst contains more than four and less than 75 mols of Cr$_2$O$_3$ per mol of WO$_3$.

3. The process of claim 1 wherein the propylene oxide vapors are heated to a temperature of at least 200° C.

4. The process of claim 1 wherein the propylene oxide vapors are passed over the catalyst at a linear velocity of 0.02–0.07 feet per second.

5. The process of making propionaldehyde comprising passing propylene oxide vapor over a heated chromic oxide-tungstic oxide complex catalyst, said catalyst being selected from the group consisting of a catalyst prepared by reacting chromium nitrate with sodium tungstate in aqueous solution, washing the precipitate free of sodium nitrate and filtering and heat-drying the precipitate, and a catalyst prepared by heating an intimate physical mixture of chromic oxide and tungstic acid to form a complex thereof having high catalytic activity, said catalyst having more than four and less than 75 mols Cr$_2$O$_3$ per mol of WO$_3$, at a temperature of at least 200° C. and at a linear velocity of 0.02–0.07 feet per second.

LESTER G. LUNDSTED.

REFERENCES CITED

The following references are of record in the file of this patent:

UNITED STATES PATENTS

| Number | Name | Date |
|---|---|---|
| 2,031,200 | Baur | Feb. 18, 1936 |
| 2,159,507 | Law et al. | May 23, 1939 |
| 2,338,089 | Bond | Jan. 4, 1944 |
| 2,351,094 | Blaker | June 13, 1944 |
| 2,439,880 | Arnold | Apr. 20, 1948 |